(12) United States Patent
Oxley

(10) Patent No.: US 8,241,096 B1
(45) Date of Patent: Aug. 14, 2012

(54) CASING CHUCK

(75) Inventor: Jeffery A. Oxley, Henderson, NV (US)

(73) Assignee: Viskase Companies, Inc., Darien, IL (US)

( * ) Notice: Subject to any disclaimer, the term of this patent is extended or adjusted under 35 U.S.C. 154(b) by 0 days.

(21) Appl. No.: 13/135,919

(22) Filed: Jul. 18, 2011

Related U.S. Application Data

(60) Provisional application No. 61/403,854, filed on Sep. 22, 2010.

(51) Int. Cl.
*A22C 11/00* (2006.01)
(52) U.S. Cl. ........................................................ 452/32
(58) Field of Classification Search .............. 452/30–32, 452/35–37, 46–48, 51
See application file for complete search history.

(56) References Cited

U.S. PATENT DOCUMENTS

| | | | |
|---|---|---|---|
| 3,115,668 A | 12/1963 | Townsend | |
| 3,191,222 A | 6/1965 | Townsend | |
| 4,812,322 A | 3/1989 | Bielanski et al. | |
| 5,013,279 A * | 5/1991 | Southworth | 452/46 |
| 5,180,327 A * | 1/1993 | Kasai et al. | 452/47 |
| 5,199,921 A | 4/1993 | Townsend | |
| RE37,883 E | 10/2002 | Townsend | |
| 6,981,912 B2 * | 1/2006 | Cate et al. | 452/32 |
| 7,739,855 B2 * | 6/2010 | Griggs et al. | 53/138.4 |

* cited by examiner

*Primary Examiner* — Richard Price, Jr.
(74) *Attorney, Agent, or Firm* — Donna Bobrowicz

(57) ABSTRACT

Chucks for a meat encasing machine that increase the hold-back force on plastic casing sticks resulting in fully formed initial links. The invention also includes a method for controlling the deshirr rate of shirred plastic casing sticks inserted in a meat encasing machine to generate fully formed initial sausage links.

7 Claims, 9 Drawing Sheets

CASING CHUCK

CROSS-REFERENCE TO RELATED APPLICATIONS

This application claims the benefit of U.S. Provisional No. 61/403,854, filed Sep. 22, 2010, which is incorporated by reference in its entirety.

FIELD OF THE INVENTION

The present invention relates to a rotatable chuck for gripping and rotating a plastic casing stick while the casing is being stuffed with a food emulsion, to facilitate the formation of initial links in a standard meat encasing machine. More particularly, the invention relates to rotatable chucks providing an increased friction means which increases drag on the casing. The present invention also relates to a method for using such chucks in a meat encasing machine to control the rate of deshirring of the casing stick, thereby increasing holdback force, or drag, on the plastic casing during deshirring.

BACKGROUND OF THE INVENTION

Stuffing or meat encasing machines of the type shown in U.S. Pat. Nos. 3,115,668 and 3,191,222 are commonly used in the manufacture of frankfurters and the like. In use, a hollow tubular shined casing stick with a closed leading edge is situated on a hollow, tubular stuffing horn and is deshirred and stuffed with a food emulsion discharged from the horn. The discharge end of the stuffing horn having the casing stick is placed about midway inside a plastic, molded, rotatable chuck having a cylindrical bore. The casing is pulled between the outer wall of the stuffing horn and the inner wall of the chuck's bore, beginning at the casing engaging zone, going through the annular passage, and as the food emulsion is discharged through the horn, the casing is deshirred and fills with the food emulsion at the discharge end of the horn, inside the chuck. As the casing fills with food emulsion, it passes longitudinally through the remaining distance of cylindrical bore in the chuck. At this point, the chuck's diameter is smaller than the diameter of the casing. This area is known as the casing deforming zone. The chuck is rotatably driven so it transfers a torque to the casing for twisting the stuffed casing into links. Twisting into links is accomplished in association with the pinchers of a conventional linking apparatus located downstream from the stuffing horn and chuck.

The chuck also is designed to impose a longitudinal drag or "holdback" on the casing moving longitudinally through its bore. Without this holdback the food emulsion will not tightly stuff into the casing. The holdback on the casing is provided by longitudinal flutes spaced circumferentially around the length of the bore of the conventional chuck member. These flutes, as shown in U.S. Pat. Nos. 3,115,668, U.S. Pat. No. 3,191,222, U.S. Pat. No. 4,812,322, and RE 37,883 extend the full length of the chuck bore and provide the holdback force on casing within the bore.

The inlet end of the chuck bore is inwardly tapered from a first relatively larger diameter to a second relatively smaller diameter at a location intermediate the inlet end and the discharge end of the bore. This tapered inlet, or casing engaging zone, is the zone that first grasps the shirred casing stick situated on the stuffing horn, and the flutes in this section or zone grip and rotate the stick while the casing is deshirred during the stuffing process. The stuffed casing then passes through the smaller diameter downstream of the intermediate location where it is deformed and gripped by the flutes pressing inwardly against the stuffed casing. The flutes, by gripping the stuffed casing, allow the chuck to transmit torque to the stuffed casing thereby rotating the stuffed casing for twisting it into links.

The flutes must be properly sized to provide sufficient holdback for stuffing, yet must not apply so much holdback that the casing will be filled with an excessive amount of meat emulsion and burst. As previously indicated, the flutes also must grip the casing to provide the needed torque transmission for twisting and linking the filled casing.

It has always been a compromise to design a chuck with flutes which provide sufficient gripping for adequate torque transmission without gripping so tightly that there is excessive holdback, as this could result in overstuffing and possible breakage of the casing. The conventional practice has been to design a chuck which provides only adequate holdback rather than risk overstuffing. However, it has been discovered that the typical chuck design which works well for cellulosic casings does not provide the same holdback force for plastic casings. This results in under stuffing of the plastic casing unless other adjustments are made. Machine adjustments can be made to increase the firmness of the stuffed food product, but there appears to be no reliable adjustment to prevent the initial links of a new shirred stick from being severely understuffed. This is not necessarily a problem for all stuffing processes, but is a significant problem for machines equipped with automatic loopers because the initial links have inadequate firmness to transfer through typical looper assemblies and frequently jam the equipment in the process, thereby stopping the high-speed production of the food product.

One attempted solution to the jamming problem is to increase the deshirr force of plastic shirred sticks. This would increase the holdback force during stuffing so the dynamics will more closely approximate stuffing of cellulosic casings. However, this approach has been attempted with limited success to date.

One object of this invention is to provide a food stuffing machine chuck member which provides more holdback force on plastic casings than commercially available chucks.

Another object of this invention is to provide a method of deshirring a shirred plastic casing and stuffing it by introducing a means to increase holdback force on the plastic casing.

These and other objects will be apparent to those skilled in the art from the following description.

SUMMARY OF THE INVENTION

It is well know in the art that a chuck for a food encasing machine has an elongated body with an axial cylindrical bore, and has an inlet end and an outlet end. The inlet is inwardly tapered from a first relatively larger diameter to a second relatively smaller diameter at an intermediate location point between the inlet and outlet. The intermediate location is found at approximately 12% of the longitudinal distance between the inlet end to the outlet end, measured from the inlet end. A casing deforming section extends from the intermediate location to the outlet end.

The chuck has a plurality of radially extending flutes, beginning at the inlet end and finishing at the outlet end, that grasp and impart rotational motion to a filled meat casing. The body has an exterior cylindrical surface.

The present invention is a particular improvement of the chuck member described above, comprising a means for increasing the holdback force on the plastic casing initially situated on the stuffing horn as it is deshirred and moves through the chuck. This is done by providing a means for reducing the inside diameter of the chuck for a portion of the length of the interior hollow bore, thereby decreasing the space available between the outer wall of the stuffing horn and the inner wall of the chuck's bore, and restricting the annular passage for the plastic casing. A preferred means for increasing this holdback force in the inventive chuck is by inserting into a portion of the interior of the chuck an inwardly tapering plastic tubular member that fits snugly against the interior flutes. This plastic tubular member preferably has a smooth interior surface, although it may also have interior flutes. A particularly preferred embodiment is the insertion of an inwardly tapering plastic tubular member that fits snugly against the interior flutes of the chuck, beginning at approximately the intermediate location and continuing forward, for a total distance of from about approximately one-quarter to about one-third of the length of the chuck. This section of the interior hollow bore of the chuck is known as the holdback force increasing zone. The tubular member may have a smooth interior and exterior surface.

Another embodiment of the present invention for increasing holdback force in the chuck is a one-piece molded chuck with the improvement being the reduction of the inside diameter designed into the chuck's interior hollow bore in the holdback force increasing zone. The reduction of the inside diameter provides the same degree of reduction as is provided by the inserted inwardly tapering plastic tubular member that fits snugly against the interior flutes of the molded chuck, as described above. The improvement to the standard chucks comprises eliminating the multiplicity of longitudinally extending casing engaging flutes in the holdback force increasing zone of the bore of the chuck, and then reducing the inside diameter of the bore in an inwardly tapering manner in the holdback force increasing zone. The interior surface of the holdback force increasing zone is preferably smooth, as in the tubular member insert above.

However, another embodiment of the present invention allows for retaining the flutes in the holdback force increasing zone but extending their height to provide the same decrease in inside diameter of the bore as does the tubular insert or the one-piece molded chuck.

Another aspect of this invention is the inwardly tapering plastic tubular member used as the insert to decrease the inside diameter of the standard chuck. The outer wall of the tubular member is a tube sized to allow it to fit snugly against the interior flutes of the holdback force increasing zone, so as to allow it to remain in place under the forces found in the moving chuck during the stuffing operation. The interior of the tubular member is inwardly tapering from a first relatively larger diameter to a second relatively smaller diameter at a location intermediate and may be smooth or may have flutes, as long as the height of the flutes provide the same restricted annual passage as would a solid surface, smooth wall. The exterior of the tubular member is smooth. The thickness of the tubular member, along with its shape, defines the amount of reduction of the interior diameter of the chuck's bore once the tubular member is fitted inside the chuck.

Preferably, an annular groove extends around the exterior cylindrical surface of the body member and a resilient O-ring is mounted in the groove and slightly projects outwardly from the groove to frictionally engage a socket into which the chuck is inserted.

Another aspect of this invention relates to a method for controlling the deshirr rate of a plastic casing stick being stuffed with food emulsion including the steps of moving the deshirring and filling casing longitudinally into the casing engaging zone, through the restrictive annular passage of the holdback force increasing zone (the zone between the inside wall of the bore of the inventive chuck and the outside wall of the stuffing horn), thereby increasing the holdback force as the food emulsion is introduced into the casing, and then moving the filled and diametrically restricted casing through a casing deforming zone where the filled casing is gripped by the inventive chuck and rotated about its longitudinal axis.

DESCRIPTION OF THE INVENTION

Figure 1:
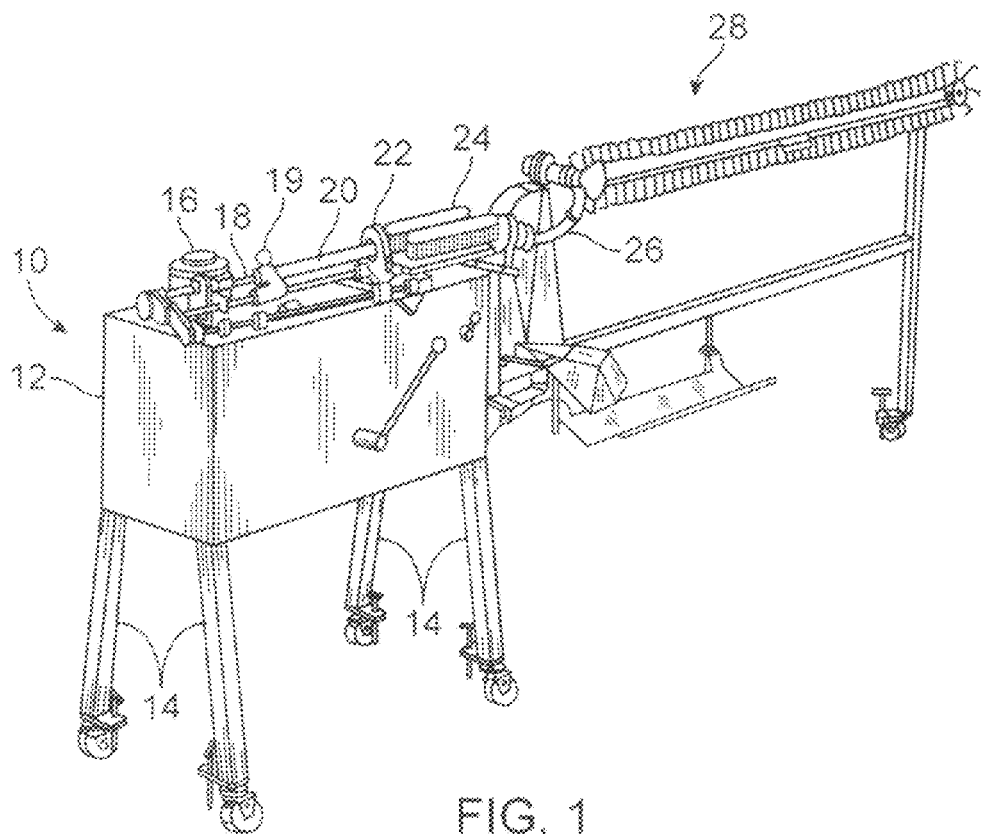
FIG. 1 is a perspective view of a stuffing machine embodying the chuck member of the invention and capable of practicing the inventive method.

FIG. 1 illustrates the essential components of a conventional food stuffing machine of the type generally described in U.S. Pat. No. 3,191,222. The stuffing machine 10 includes a frame 12 supported on four legs 14. A food emulsion pump 16 mounted on frame 12 communicates with a retractable stuffing horn 18. A food emulsion (e.g., a meat emulsion) is pumped from a reservoir (not shown) through pump 16 and into stuffing horn 18. A follower 19 is slideably mounted on stuffing horn 18 to move a hollow shirred food casing stick 20 forward and towards the discharge end 21 (FIG. 2) of stuffing horn 18.

Figure 2:
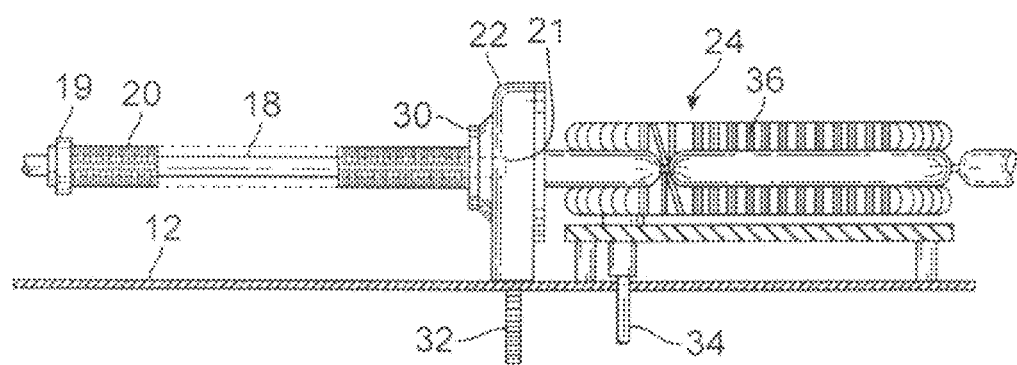
FIG. 2 is an enlarged elevation view of a portion of the FIG. 1 stuffing machine illustrating the stuffing tube, the chuck housing, and the linking mechanism.

As shown in FIGS. 1 and 2, a chuck housing 22 is mounted on the frame about the discharge end 21 of the stuffing horn. Also mounted on frame 12 downstream from the chuck housing is a linking mechanism 24. A looper 26 (FIG. 1) on frame 12 receives linked food-stuffed casings from linking mechanism 24 and swings in a conventional fashion to loop the links onto a J-hook conveyor 28.

Chuck housing 22 (FIG. 2) includes a rotatably driven member 30 which is rotatably connected to a drive gear 32, which, in turn, is connected to a source of rotational power (not shown). Similarly, a drive shaft 34 is connected to linking mechanism 24 to cause rotation of linking chains 36 serving to link the food-stuffed casing in a conventional manner.

Chuck housing 22 (FIG. 3) has a hollow interior compartment 42 and a hollow bore 44 extending therethrough. A bearing sleeve or socket 46 is mounted within housing 22 and is adapted to be rotatably driven by drive gear 32 which is connected to a source of rotational power (not shown). A drive pin 29 shown in dotted lines in FIG. 3 extends inwardly from bearing sleeve 46 to engage and drive the chuck 48.

Figure 3:
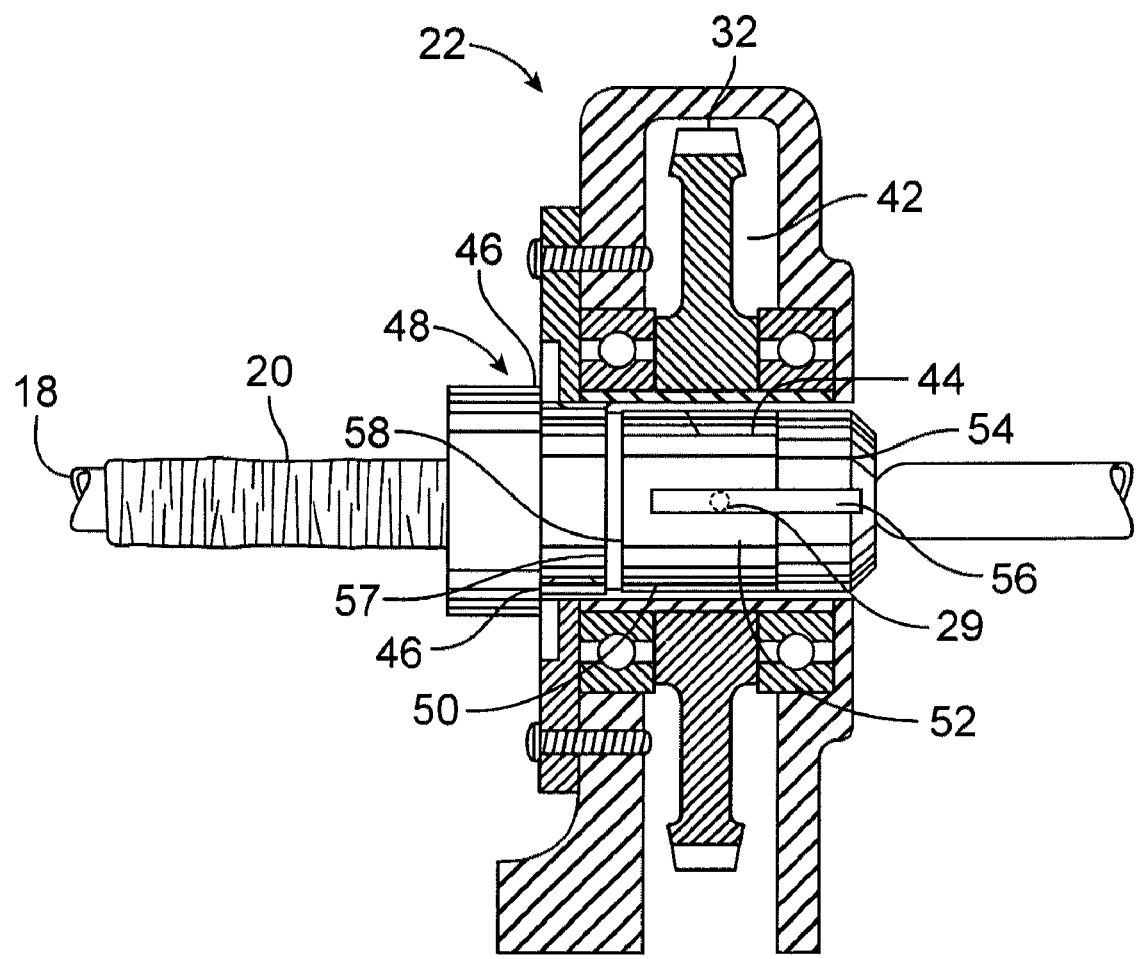
FIG. 3 is a further enlarged longitudinal view taken in a cross-section of the chuck housing and a standard chuck member.
Figure 4A:
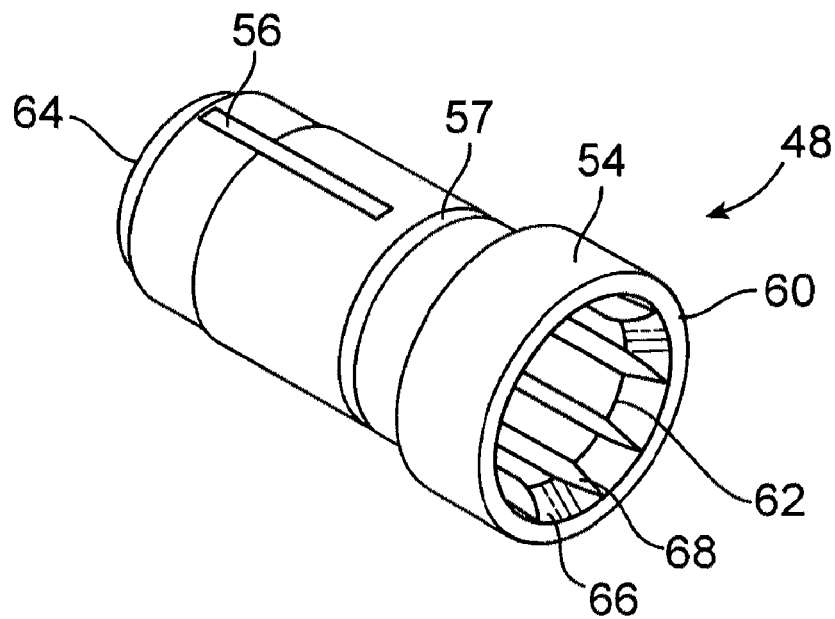
FIG. 4A is a view of the FIG. 3 chuck member with the outlet end facing forward.
Figure 4B:
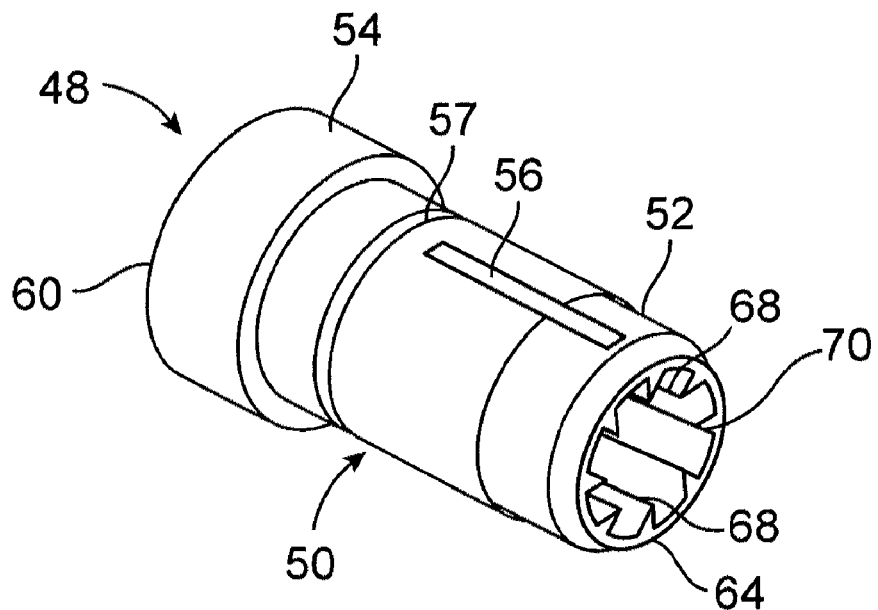
FIG. 4B is a view of the FIG. 3 chuck member with the inlet end facing forward.

One preferred variation of a standard chuck is shown in FIGS. 4A and 4B and described in U.S. Reissued Pat. No. RE37,883 E. Chuck 48 is comprised of a hollow cylindrical body 50 which has an outer surface 52 and a shoulder 54 mounted adjacent its inlet end 60. An elongated groove 56 is milled or otherwise formed in the outer surface 52 of cylindrical body 50 as shown in FIGS. 3, 4A, and 4B. The drive pin 29 as seen in FIG. 3 is adapted to penetrate into the elongated drive groove 56. Chuck 48 has an outlet end 64 An annular groove 57 is formed in the outer surface 52 of body 50, and resilient O-ring 58 (FIG. 3) is frictionally mounted therein. This O-ring fixedly holds the bearing sleeve against any oscillation within bearing sleeve 46 in the event that some space does exist between the outer surface 52 of the cylindrical body 50 of the chuck and the interior surface of the bearing sleeve 46.

Parallel flutes 68 run the length of the interior of the chuck 48 and have a base larger than the apex, or trailing edge 70, with the trailing edge 70 facing into the hollow interior of the chuck 48, particularly as seen at 68 in FIG. 4B. The flutes 68 are regularly spaced around the inner circumference of the interior of the chuck 48. Although the inlet end 60 has an inwardly tapering casing engaging section 66, the height of the flutes 68 remains the same from the intermediate location 62 to the outlet end 64. The portion of the flutes 68 on the tapered casing engaging section 66 are bent at the intermediate location 62. The purpose of the flutes 68 is to engaging the shirred food casing stick 20 and to slightly hold back the casing stick 20 as it is being deshirred by the pressure of food material being forcibly shot in to the casing stick 20.

All of the components of the machine 10 described above and the chuck 48 are of conventional construction and do not of themselves comprise the essence of this invention.

Figure 5:
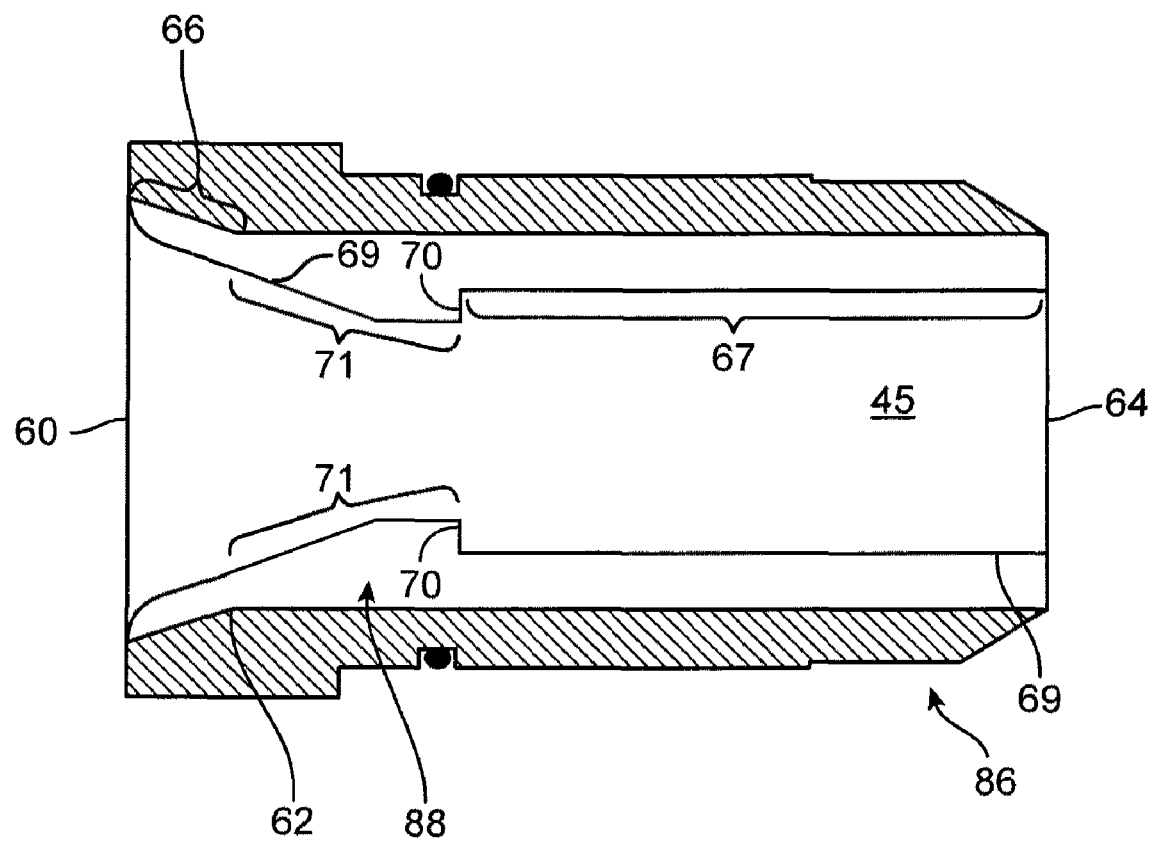
FIG. 5 is an enlarged longitudinal view taken in cross-section of the inventive one-piece chuck member.
Figure 9:
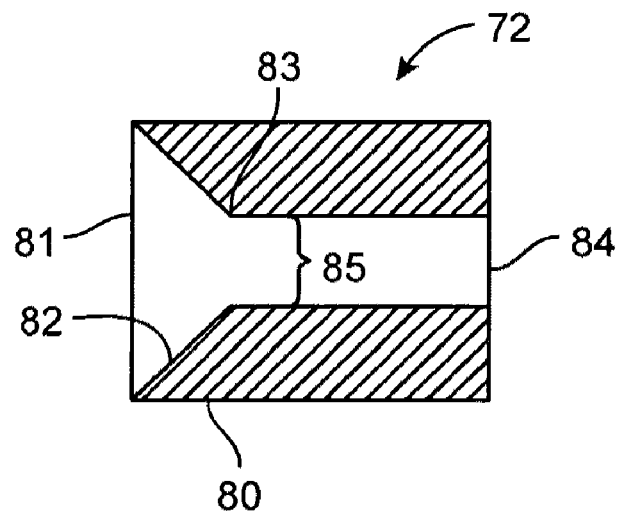
FIG. 9 shows a longitudinal cross-sectional view of the inventive restrictive insert.

The inventive one-piece chuck 86 is best seen in FIG. 5, the longitudinal view of a cross-section of the one-piece inventive chuck 86. In this preferred embodiment, the inventive chuck 86 is molded as a hollow, cylindrical body having a tapered inner surface and as one piece of plastic. The interior of bore inlet end 60 is inwardly tapered from a first relatively larger diameter to a second relatively smaller diameter at a intermediate location indicated at 62 between inlet end 60 and outlet end 64. Intermediate location 62 is located up to about 20% of the longitudinal distance from inlet end 60 to outlet end 64, so as to form a tapered casing engaging section 66 upstream of intermediate location 62 and a filled casing deforming zone 67 located downstream of the intermediate location 62, starting at trailing edge 70 of the restrictive area 88 and ending at outlet end 64. In this embodiment of the invention, the dimensions of restrictive area 88 are the same as those provided by restrictive insert 72 as shown in FIG. 9, which are designed into and molded into hollow bore 45 of the inventive chuck 86.

As in the conventional chuck 48 seen in FIGS. 4A and 4B, the hollow bore 45 of the inventive chuck 86 includes a multiplicity of longitudinally extending flutes 68, as shown in FIG. 5 by the flute line 69. Flutes 68 extend upward from the inner wall of the tapered bore 45 and are spaced circumferentially around the periphery of the tapered hollow bore 45, except for the area containing the restricted annular passage 71. In other words, flutes 68 longitudinally extend the entire length of the tapered casing engaging section 66 and also the filled casing deforming zone 67, shown in FIG. 5. For example, the smooth, recessed portion of hollow bore 45 between the flutes 68 is seen at 74 in FIG. 8. The section of the bore from intermediate location 62 to trailing end 70 does not contain any flutes, but rather has a smooth wall, which begins as a smooth transition from the tips of the flute, shown by the flute tips 69.

Figure 6:
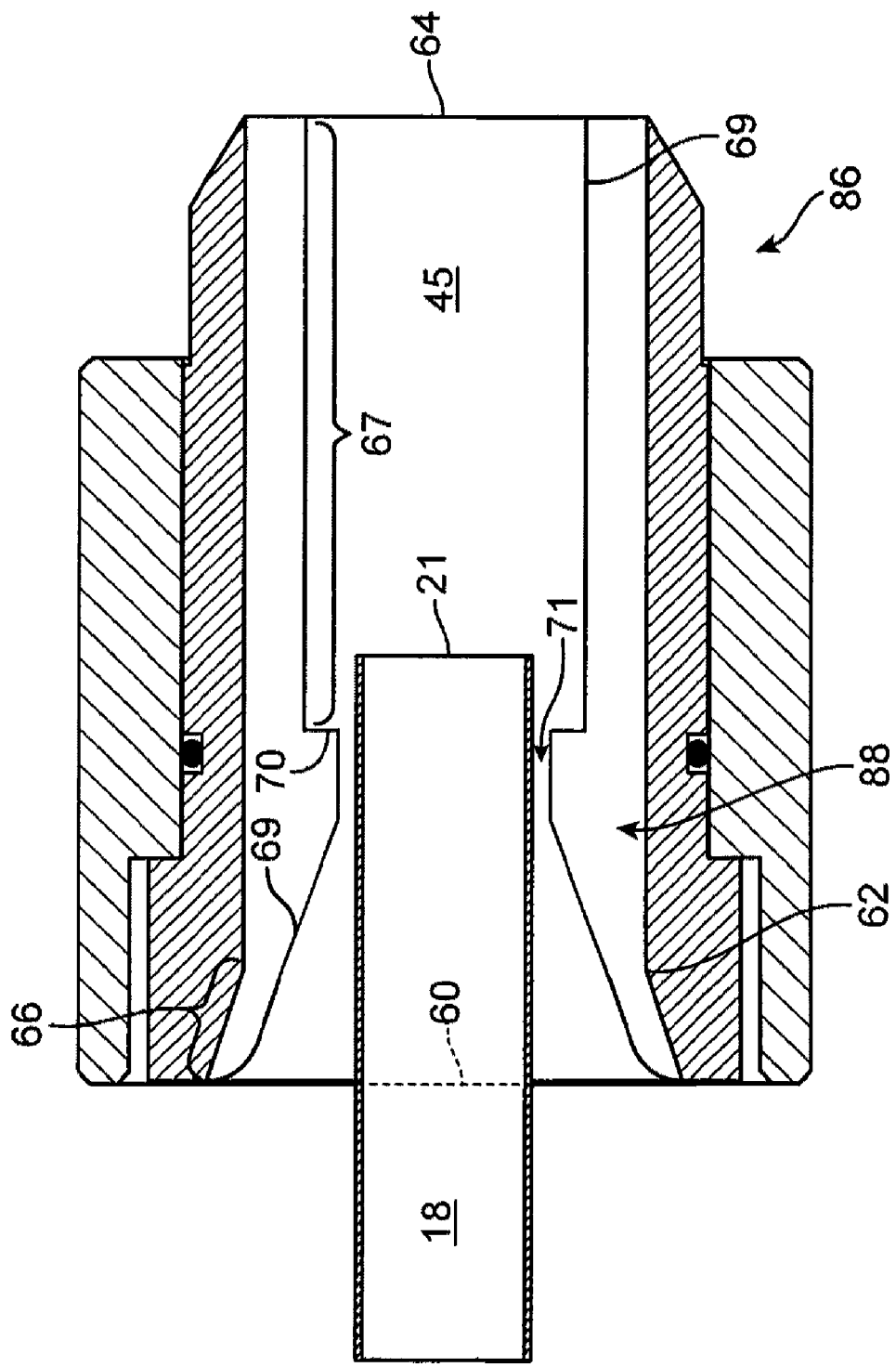
FIG. 6 is an enlarged longitudinal view taken in cross-section of the inventive one-piece chuck member situated in the chuck housing, with a retractable stuffing horn inserted in the chuck member.
Figure 7:
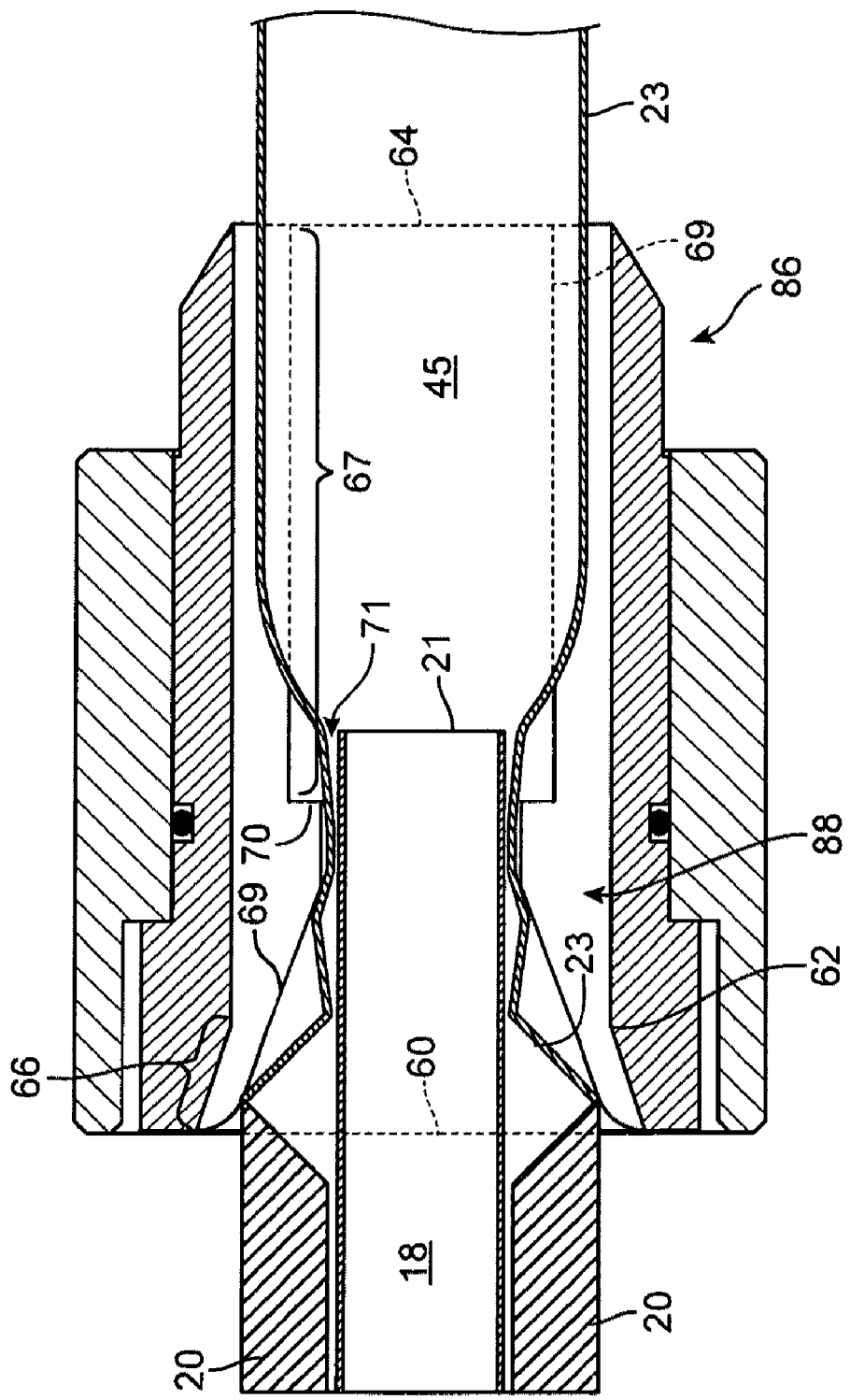
FIG. 7 is an enlarged longitudinal view taken in cross-section of the inventive one-piece chuck member situated in the chuck housing, with a retractable stuffing horn having a food casing stick partially deshirred over the length of the stuffing horn inserted into the chuck member and into the hollow bore of the inventive chuck.

In a stepwise progression, FIGS. 6 and 7 shown how the inventive chuck 86 is used. As shown in FIG. 6, the area of the tapered casing engaging section 66 receives the front end of stuffing horn 18. As can be seen here, the restricted annular passage 71 is restricted because the restricted area 88 impinges into the hollow bore 45 of the inventive chuck 86 to a greater degree than do the flute tips 69 found in the tapered casing engaging section 66 and the filled casing deforming zone 67, thereby minimizing the space around the stuffing horn 18.

FIG. 7 continues the stepwise progression, by showing food casing stick 20 with its various amounts of shirring on stuffing horn 18 seen prior to inlet end 60, the food casing stick 20 is shirred, or tightly pleated. This tightly pleated food casing stick is inserted onto stuffing horn 18, which is further inserted into the inventive chuck 86, with the flutes 68 in engaging section 66 grasping the casing stick 20. A meat emulsion is fed through the stuffing horn 18 under great force, thereby exerting force on the shirred food casing stick 20, and deshirring the food casing stick 20 by pulling it forward through the casing engaging section 66, the restricted annular passage 71, and the casing deforming zone 67. At intermediate location 62 through trailing edge 70, the restricted annular passage 71 increases the drag on the deshirred casing 23 as it is pulled forward.

The restricted annular passage 71 is narrowed to a diameter that increases the drag force on the deshirred casing 23, but still allows the deshirred casing 23 to move through the stuffing machine 10, thereby forming sausage links without jamming, and at a speed acceptable to meat processors. As the restrictive insert diameter is reduced closer to the outer diameter of stuffing horn 18, the restrictive annular passage 71 is more restrictive and results in more drag, or holdback force. Depending on the specific application, i.e. sausage size, type of casing, needed by the food manufacturer, the inside diameter of the hollow bore 45 at the restrictive annular passage 71 can be sized to provide the desired amount of drag force required. The amount of drag force needed will also be affected by the type and size of the casing used.

The flutes 68 reengage with the casing after trailing edge 70 in the filled casing deforming zone 67, thereby gripping the filled casing for transmitting torque to said casing. In this fashion, the rotation of the inventive chuck 86 about the longitudinal axis is transmitted to the food casing stick 20, both filled and unfilled, for rotatably driving both around the fixed stuffing horn 18.

Figure 10:
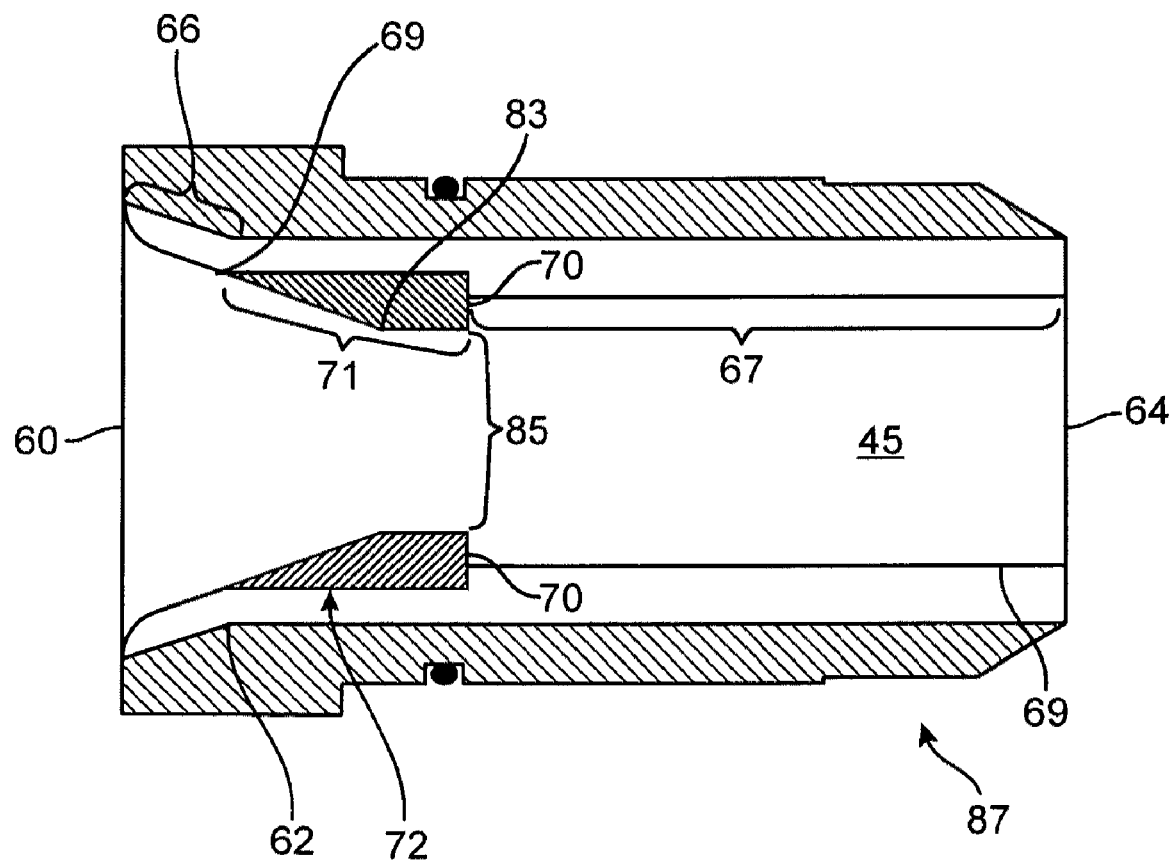
FIG. 10 is an enlarged longitudinal view taken in cross-section of the inventive two-piece chuck member containing the inventive restrictive insert.

Another embodiment of the present invention is a two-piece chuck 87 (FIG. 10) having two molded pieces: a modified standard chuck 48, similar to the one shown in FIGS. 4A and 4B and described above and a separate restrictive insert 72 inserted therein. FIG. 9 shows a longitudinal cross-sectional view of restrictive insert 72. The restrictive insert 72 is a cylindrical, tubular sleeve having a smooth outer wall 80 having a uniform outside diameter and a smooth inner bore having a tapered leading section 82. The bore inlet 81 is inwardly tapered from a first relatively larger diameter to a second relatively smaller diameter 85 at a intermediate location indicated at 83 between the bore inlet 81 end and bore outlet end 84. This restrictive insert 72 is tightly pressed into a modified standard commercial chuck 48, which has been counterbored to accept the restrictive insert in the proper position, providing a restrictive annular passage 71. As seen in FIG. 10, restrictive insert 72 has been pressed into the modified chuck 48.

Figure 8:
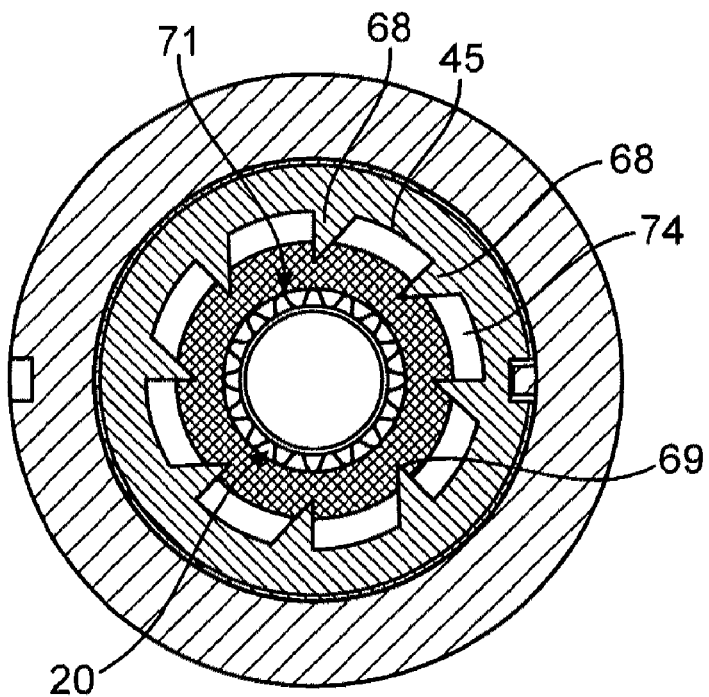
FIG. 8 is an end view of the outlet end of the FIG. 10 two-piece chuck member particularly illustrating the flutes.

As best seen in FIG. 8, an end view of the outlet end of the FIG. 10 two-piece chuck member 87 particularly illustrates the flutes. The hollow bore 45 of the inventive two-piece chuck 87 includes a multiplicity of longitudinally extending flutes 68. These flutes 68 extend upwards from the inner wall of the tapered bore 45 and are spaced as described above. Furthermore, the flutes 68 longitudinally extend the entire length of the casing engaging section 66 and also the casing deforming zone 67, shown in FIG. 10. The tips of the flutes 68 are shown along flute lines 69. The smooth portion of the hollow bore 45 between the flutes 68 is seen at 74, which also represents the air pocket between the outer wall 80 of the restrictive insert 72 and the hollow bore 45 between the flutes 68 that were counterbored to accept the restrictive insert 72. The section of the bore from intermediate location 62 to trailing end 70 does not contain any flutes, but rather has a smooth wall.

Figure 11:
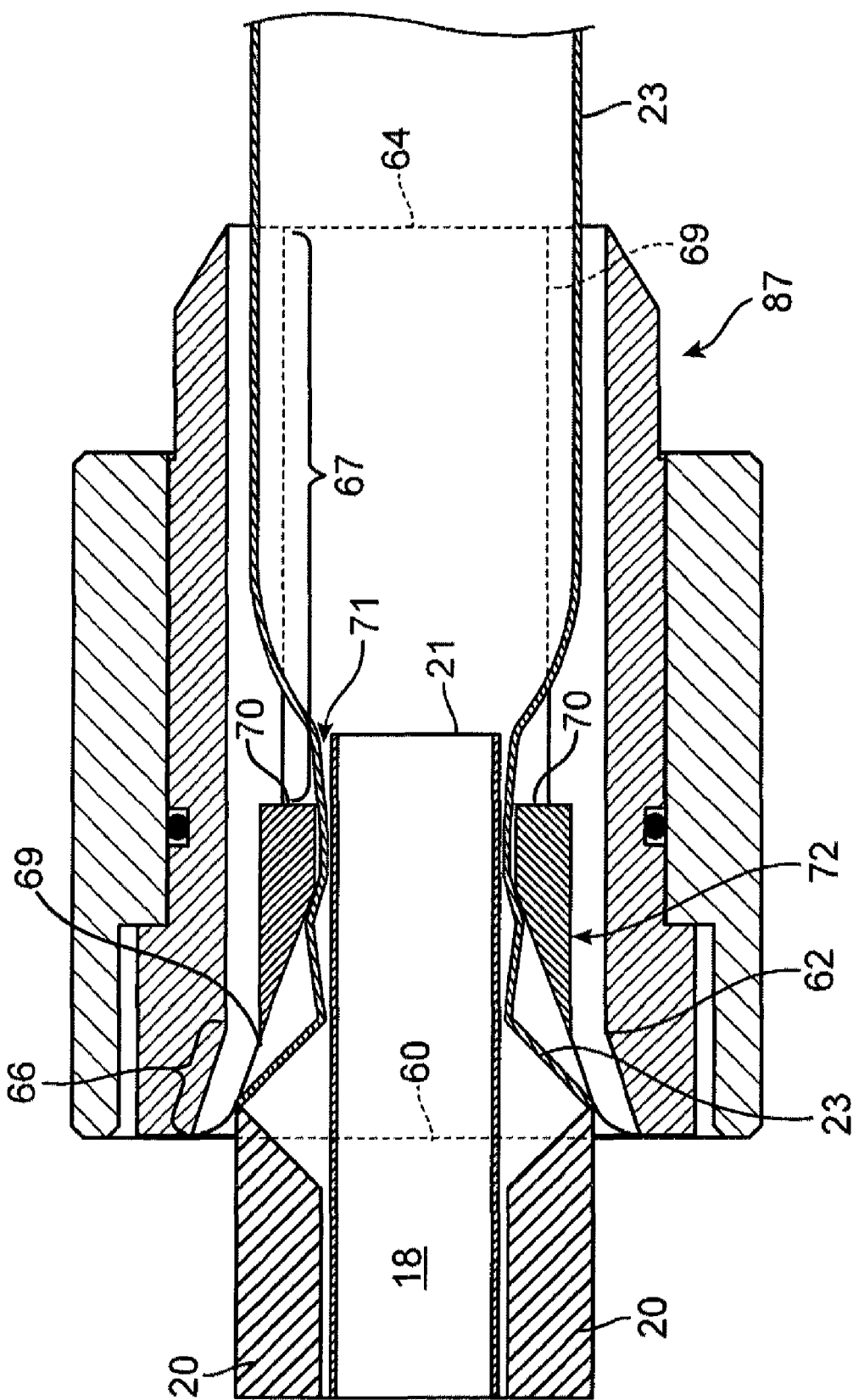
FIG. 11 is an enlarged longitudinal view taken in cross-section of the inventive two-piece chuck member situated in the chuck housing, with a retracted stuffing horn having a casing stick partially deshirred over the length of the stuffing horn, which is inserted into the hollow bore of the inventive chuck.

In FIG. 11, food casing stick 20 on stuffing horn 18 is introduced into the inventive two-piece chuck 87, and deshirrs as described above for the inventive one-piece molded chuck 86 as a food emulsion is shot through the stuffing horn 18 at great pressure.

In each of these embodiments, the inventive one-piece chuck and two-piece chuck are readily modifiable by those skilled in the art of manufacturing equipment and parts for equipment used for the production of linked sausages or other food stuffs. The increase in the holdback force is ascertainable by one skilled in the art with minimal experimentation.

Another embodiment of the present invention is found in a method for controlling the deshirr rate of a shirred plastic food casing stick 20 situated on a stuffing horn 18 inserted into a chuck of a meat encasing machine 10, and stuffing the casing stick 20 with a food emulsion while inside said chuck, with the improvement comprising forcing the deshirred casing 23 through a restrictive annular passage 71 between the inside wall of the bore 45 of a one-piece molded chuck 86 as described above and the outside wall of the stuffing horn 18, as described above, thereby increasing the holdback force as the food emulsion is introduced into the casing. By using this improvement, the plastic casing will not jam when the first few links are made.

Still another embodiment of the present invention is found in a method for controlling the deshirr rate of a shirred plastic food casing stick 20 situated on a stuffing horn 18 inserted into a chuck of a meat encasing machine 10, and stuffing said casing stick 20 with food emulsion while inside said chuck, wherein the improvement comprises forcing the deshirred casing 23 through a restrictive annular passage 71 between the inside wall of the bore of a two-piece modified chuck 87 and the outside wall of the stuffing horn, as described above, thereby increasing the holdback force as the food emulsion is introduced into the casing. By using this improvement, the plastic casing will not jam when the first few links are made.

EXAMPLE 1

A series of tests was conducted to compare the longitudinal forces required to pull cellulose and plastic casing through four different chucks (Std. 22, H22-16, H22-18, and H22-19) on a food encasing machine of the FIGS. 1-2 type (Model RT-7 manufactured by Townsend Engineering Company). In this test, nonreinforced shirred cellulosic casing size 25 (dry flat width about 1.32 inches) manufactured by Viskase Companies, Inc. of Darien, Ill., USA, or nylon casing size 22 (dry flat width about 1.36 inches), also manufactured by Viskase Companies, Inc. of Darien, Ill., USA, was used. These casings were manually pulled through the chucks. The drag force or "holdback" force was measured in pounds, and the data are summarized in Table A.

The chuck labeled as "Std. 22" was a standard plastic molded chuck in commercial use and sold by Townsend Engineering Company for stuffing nonreinforced casing. This commercial chuck is similar to the chuck shown in U.S. Pat. No. RE37,883E, issued to Ray T. Townsend and reissued on Oct. 15, 2002. The chuck had eight flutes uniformly circumferentially spaced around the periphery of the chuck bore and extending the entire length of the bore. The chuck had an overall length of approximately 2.40 inches, comprising a 0.28 inch long inwardly tapered casing engaging inlet section and a 2.12 inch long casing deforming section. The inlet diameter was 1.178 inches and the diameter of the casing deforming section of the bore was 0.688 inch. The flutes in the casing engaging section gradually increased in width and height from the inlet end toward the deforming section so as to blend with the geometry of the flutes in the deforming section, resulting in an orifice of $^{22}/_{32}$ inch (or 0.687 inch). Each flute at full size had a first perpendicular sidewall height of 0.15 inch and the included angle of the intersecting second sidewall was about 43 degrees with a 0.125 inch wide base section.

The inventive one-piece chuck labeled "H22-19" was identical to chuck "Std. 22" except that the interior of the "Std. 22" was counterbored in order to allow a restrictive tubular insert 72 with smooth inside and outside walls to be firmly positioned inside the chuck. The insert was 0.600 inches in length and tapered to a $^{19}/_{32}$ inch orifice (or bore) in the restricted annular passage 71; the inwardly tapering wall 82 was about 0.294 inch in length.

The inventive two-piece chuck labeled "H22-16" was identical to chuck "H22-19" except that it had a $^{16}/_{32}$ inch orifice (or bore) in the restricted annular passage 71.

The inventive two-piece chuck labeled "H22-18" was identical to chucks H22-19 and H22-16, except that it had a $^{18}/_{32}$ inch orifice (or bore) in the restricted annular passage 71.

The food casing stick was positioned in the normal stuffing position in the chuck with a follower pressure of 12.5 psi, and with the horn inserted into the casing. The casing was pulled through the chuck in the normal stuffing direction. The "drag" or "pull" force or "holdback" force measured was the maximum reading at the start of deshirring the casing over a 6 inch distance. The results of these tests are summarized in Table A.

TABLE A

Static Pull Test

| Casing Type | Chuck | Horn Size (inch) - Resulting gap of restrictive annular passage | Pull Force, lbs. |
| --- | --- | --- | --- |
| Cellulose 25 | Std. 22 | $^{15}/_{32}$-$^{3.5}/_{32}$ inch | 1.24 |
| Plastic 22 | Std. 22 | $^{15}/_{32}$-$^{3.5}/_{32}$ inch | 0.28 |
| Cellulose 25 | H22-19 | $^{15}/_{32}$-$^{2}/_{32}$ inch | 4.13 |
| Plastic 22 | H22-19 | $^{15}/_{32}$-$^{2}/_{32}$ inch | 0.71 |
| Plastic 22 | H22-18 | $^{15}/_{32}$-$^{1.5}/_{32}$ inch | 1.03 |

TABLE A-continued

Static Pull Test

| Casing Type | Chuck | Horn Size (inch) - Resulting gap of restrictive annular passage | Pull Force, lbs. |
| --- | --- | --- | --- |
| Cellulose 25 | Std. 22 | 14/32-4/32 inch | 1.45 |
| Plastic 22 | Std. 22 | 14/32-4/32 inch | 0.64 |
| Plastic 22 | Std. 22 | 14/32-4/32 inch | 0.53 |
| Plastic 22 | H22-19 | 14/32-2.5/32 inch | 1.88 |
| Plastic 22 | H22-16 | 14/32-1/32 inch | 2.00 |

This data shows that the chucks of the present invention impart substantially more drag force or holdback force on both the cellulose and plastic casings than does the prior art chuck, Std. 22. Any reduction in the annular passage resulted in more holdback force on the casings. A restricted annular passage increased the drag force about 2-3 times over that seen with the standard chuck, thereby excluding the use of cellulose casings. The plastic casing, needing more drag to overcome the jamming problem associated with high speed stuffing, is useable in a commercial stuffing operation with the degrees of drag shown here, thereby allowing even the very beginning of the casing stick to be properly filled and not cause jamming of the stuffing equipment.

All US patents described or mentioned in this specification are hereby incorporated by reference.

While specific embodiments of the invention have been described above, it will be appreciated that departures from the described embodiments may still fall within the scope of the invention. For example, there may be any number of different sized restricted annular passages and the corresponding molded one-piece chucks or the corresponding tubular inserts used in modified standard chucks to obtain the same result.

What is claimed is:

1. A chuck for a meat encasing machine which increases the holdback force on plastic casing comprising:
    (a) an elongated body having an axial cylindrical bore to accommodate the passage through said body of a casing being stuffed which is placed over a stuffing horn, said bore defining a longitudinal axis about which said body is rotatable and having:
        (i) an inlet end and an outlet end;
        (ii) a casing engaging inlet section which tapers inwardly from a large diameter at said inlet to a smaller diameter at a location intermediate said inlet end and said outlet end;
        (iii) a casing deforming section extending from said intermediate location to said outlet end;
    (b) a multiplicity of longitudinally extending casing engaging flutes in said bore;
    (c) the improvement comprising a means for reducing the inside diameter of said bore from about said intermediate location and continuing for a total distance towards the outlet end, of from about one-quarter to about one-third of the length of the chuck, thereby providing a holdback force increasing zone.

2. A chuck member according to claim 1, wherein the means for reducing the inside diameter of said bore is an inwardly tapering plastic tubular member fitted snugly against the interior flutes of said bore in said holdback force increasing zone.

3. A chuck according to claim 2, wherein said tubular member has a smooth, uninterrupted inner and outer surface.

4. In a method for controlling the deshirr rate of a shirred plastic food casing stick situated on a stuffing horn inserted into a chuck of a meat encasing machine and stuffing said casing with food emulsion while inside said chuck, wherein the improvement comprises forcing the deshirred casing through a restrictive annular passage between the inside wall of the bore of a two-piece chuck according to claim 2 and the outside wall of the stuffing horn, thereby increasing the holdback force as the food emulsion is introduced into the casing.

5. A one-piece molded chuck for a meat encasing machine which increases the holdback force on plastic casing comprising:
    (a) an elongated body having an axial cylindrical bore to accommodate the passage through said body of a casing being stuffed, said bore defining a longitudinal axis about which said body is rotatable and having:
        (i) an inlet end and an outlet end;
        (ii) a casing engaging inlet section which tapers inwardly from a large diameter at said inlet to a smaller diameter at a location intermediate said inlet end and said outlet end;
        (iii) a casing deforming section extending from said intermediate location to said outlet end;
    (b) a multiplicity of longitudinally extending casing engaging flutes in said bore;
    (c) the improvement comprising eliminating said multiplicity of longitudinally extending casing engaging flutes in the holdback force increasing zone located between said intermediate location and continuing for a total distance towards the outlet end, of from about one-quarter to about one-third of the length of said chuck, and reducing the inside diameter of said bore in an inwardly tapering manner in the holdback force increasing zone.

6. A one-piece molded chuck according to claim 5, wherein said holdback force increasing zone has a smooth uninterrupted surface.

7. In a method for controlling the deshirr rate of a shirred plastic food casing situated on a stuffing horn inserted into a chuck of a meat encasing machine and stuffing it with food emulsion while inside said chuck, wherein the improvement comprises forcing the deshirred casing through a restrictive annular passage between the inside wall of the bore of a one-piece modified chuck according to claim 5 and the outside wall of the stuffing horn, thereby increasing the holdback force as the food emulsion is introduced into the casing.

* * * * *